US006234345B1

(12) United States Patent
Minh et al.

(10) Patent No.: US 6,234,345 B1
(45) Date of Patent: May 22, 2001

(54) TRANSPORTATION VENDING MACHINE

(75) Inventors: Tran Q. Minh, Starbridge; Paul Albert Carlson, Kennesaw, both of GA (US); Alejandro Reynal, Boston, MA (US); Stephan A. Osborne, Moreland Hills, OH (US); Rex M. Baker, III, North Port, NY (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 09/261,263

(22) Filed: Mar. 3, 1999

(51) Int. Cl.[7] .................................................. B65G 59/00

(52) U.S. Cl. .......................... 221/124; 221/125; 221/131; 221/150 R; 221/185; 221/195; 221/256

(58) Field of Search .................................... 221/123, 124, 221/125, 131, 150 R, 185, 191, 194, 195, 256, 266, 312 R, 281; 312/36, 42, 45, 72, 73

(56) References Cited

U.S. PATENT DOCUMENTS

| | | | | |
|---|---|---|---|---|
| D. 290,142 | | 6/1987 | Morgan, Jr. et al. | D20/5 |
| 353,572 | | 11/1886 | Meyers . | |
| 495,351 | | 4/1893 | Luster . | |
| 2,521,458 | * | 9/1950 | Huheey et al. | 221/125 |
| 2,529,600 | | 11/1950 | Dixon . | |
| 2,671,001 | | 3/1954 | Ossanna, Jr. . | |
| 3,010,556 | * | 11/1961 | Wawrzonek et al. | 221/125 X |
| 3,066,827 | | 12/1962 | Pryor . | |
| 3,172,713 | | 3/1965 | Rupert . | |
| 3,795,345 | * | 3/1974 | Baxendale | 221/125 |
| 4,287,992 | | 9/1981 | Takemori . | |
| 4,493,441 | | 1/1985 | Sedam et al. . | |
| 4,576,272 | | 3/1986 | Morgan, Jr. et al. | 194/215 |
| 4,629,090 | | 12/1986 | Harris et al. . | |
| 4,637,222 | | 1/1987 | Fujiwara et al. . | |
| 4,671,070 | | 6/1987 | Rudick . | |
| 4,676,074 | | 6/1987 | Morgan, Jr. et al. | 62/277 |
| 4,729,480 | | 3/1988 | Groover et al. | 211/59 |
| 4,738,113 | | 4/1988 | Rudick | 62/3 |
| 4,913,713 | | 4/1990 | Bender et al. . | |
| 4,915,571 | | 4/1990 | Toshihiko et al. . | |
| 4,917,264 | | 4/1990 | Gasiel et al. . | |
| 5,209,069 | | 5/1993 | Newnan . | |
| 5,247,798 | | 9/1993 | Collard, Jr. . | |
| 5,337,579 | | 8/1994 | Saia, III et al. . | |
| 5,367,887 | | 11/1994 | Byrd et al. . | |
| 5,392,953 | * | 2/1995 | Maldanis et al. | 221/124 X |
| 5,462,198 | | 10/1995 | Schwimmer . | |
| 5,469,708 | | 11/1995 | Harrison et al. . | |
| 5,651,476 | | 7/1997 | Percy et al. . | |

FOREIGN PATENT DOCUMENTS

| | | | | |
|---|---|---|---|---|
| 0022589 | | 1/1981 | (EP) . | |
| 2132178 | * | 7/1984 | (GB) | 221/125 |
| 4188295 | | 7/1992 | (JP) . | |
| 5151443 | | 6/1993 | (JP) . | |

* cited by examiner

*Primary Examiner*—David H. Bollinger
(74) *Attorney, Agent, or Firm*—Finnegan, Henderson, Farabow, Garrett & Dunner, L.L.P.

(57) ABSTRACT

A transportation vending machine, and more generally a vending machine and cooling dispenser especially suited to environments in which there is limited space available. A serpentine path in the dispenser is formed from two-pieces of rotary-molded plastic having complimentary, serpentine surfaces which form a serpentine path when positioned against one another. Vending, without the need for selection buttons, is achieved by way of the cradles and an interlock system. Efficient cooling is provided by a thermoelectric cooling system that also consumes very little space.

25 Claims, 12 Drawing Sheets

TRANSPORTATION VENDING MACHINE

FIELD OF THE INVENTION

The invention is directed toward a vending machine, and more particularly toward a vending machine for use in an environment with having reduced available space, such as would be found in a vehicle.

BACKGROUND OF THE INVENTION

Over thirty (30) years ago, it was known very generally to vend certain products in a vehicle. For example, the Rupert patent (U.S. Pat. No. 3,172,713), patented Mar. 9, 1965, was directed toward a vending machine apparatus to be used in conjunction with a vehicle seat structure. This invention was intended to vend small items such as cigarettes, candy, combs, or hand lotion, in a taxi cab. The vending machine was designed to fit into the backside of the front seat, so that it faced the passengers sitting in the rear seat.

Of the two (2) embodiments disclosed by the Rupert patent, the more space-efficient embodiment consisted of plural individual vending machines arranged side-by-side. To restock any one of these individual vending machines required its removal from the backside of the front seat. The less space-efficient embodiment took the form of a more conventional singular vending machine having a plurality of vended items. To restock the less space-efficient embodiment, it was necessary to open the entire face of the machine.

The Rupert patent did not disclose, nor did it envision, that it would be desirable to dispense, much less vend, refrigerated items in a moving vehicle.

In some countries, public transportation, especially inter-city transportation, takes place primarily on coach buses. Such buses seat approximately forty to sixty (40–60) people, and usually have a lavatory. The provision of a lavatory makes it possible to travel non-stop between cities, or to stop very infrequently. With few to no stops, there is little to no opportunity for a passenger on such a coach to obtain refreshments, such as soft drinks.

Typical vending machines are very large in size, which is impractical for the very limited space available in a coach bus. Also, the typical vending machine is cooled via a compressor driven by a motor. Such a cooling system consumes a great deal of energy, is very bulky, and generates a great deal of heat. Again, this is impractical for the typical coach bus, in terms of the volume of space consumed, the power consumed to run the compressor, and the large quantities of heat generated by the compressor.

It is not convenient to simply provide a cooler from which a passenger can withdraw a soft drink and pay an attendant. The profit margin for such a vending operation is small, so that the cost of paying an attendant would likely consume the profits from the sale of the beverage. The responsibilities of attendant and driver could be combined, but this presents a safety hazard if the driver is responsible for vending the soft drinks from the cooler.

SUMMARY OF THE INVENTION

A problem recognized by the Inventors is that there is no cooling dispenser suitable for use in a transportation environment such as a coach bus, much less a vending machine suited for such an environment.

Among other accomplishments, the invention solves the problem in the prior art by providing a cooling dispenser that is sufficiently small in size to be suitable for use on a coach bus. The invention can be of such small size because it incorporates a thermoelectric cooling system, and a vending system that does not require selection buttons.

The profit margin in the vending machine industry is very small, this being especially true for a vending operation in the environment of a coach bus or other vehicle. The invention improves the profitability of such an operation by providing a vending machine that is not only small in size, but is very economical to produce. This, in part, is made possible because the body of the vending machine is formed from two (2) molded plastic halves, each half having a complementarily-shaped serpentine surface. When the complimentarily-shaped serpentine surfaces are arranged against one another, a serpentine path is defined in between them. The stock of the vending machine is stored in one or more serpentine paths defined by the complimentarily-shaped serpentine surfaces.

It is an object of the invention to provide each of a dispenser and vending machine, preferably on a vehicle, having one or more two-part serpentine dispensing paths, the first of the two parts being complementarily-shaped with respect to the second of the two parts.

It is an object of the invention to provide each of a dispenser and vending machine, preferably on a vehicle, that is formed of molded plastic, preferably rotomolded plastic.

It is an object of the invention to provide each of a dispenser and vending machine, preferably on a vehicle, cooled by a thermoelectric device.

It is an object of the invention to provide each of a dispenser and vending machine, preferably on a vehicle, having cradle-terminated dispensing paths, wherein movement of the cradles is electromechanically controlled.

It is an object of the invention to provide a vending machine, preferably on a vehicle, that is operable without the provision of selection buttons.

It is an object of the invention to provide each of a dispenser and vending machine, preferably on a vehicle, having multiple openings in the face, some of the openings being operable to convey dispensed items to a user/customer, and at least one other opening being operable to permit a stock of the dispenser and vending machine, respectively.

It is an object of the invention to provide each of a dispenser and vending machine, preferably on a vehicle, having a power quality circuit to interrupt power to a cooling system if power supplied by the vehicle is of unacceptable quality.

It is an object of the invention to provide each of a dispenser and vending machine, preferably on a vehicle, having debounced sensor circuitry to filter out spurious signals caused by vibration of the substrate to which the dispenser and vending machine are mounted, e.g. a vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention, and wherein.

DETAILED DESCRIPTION OF THE INVENTION

Figure 1:
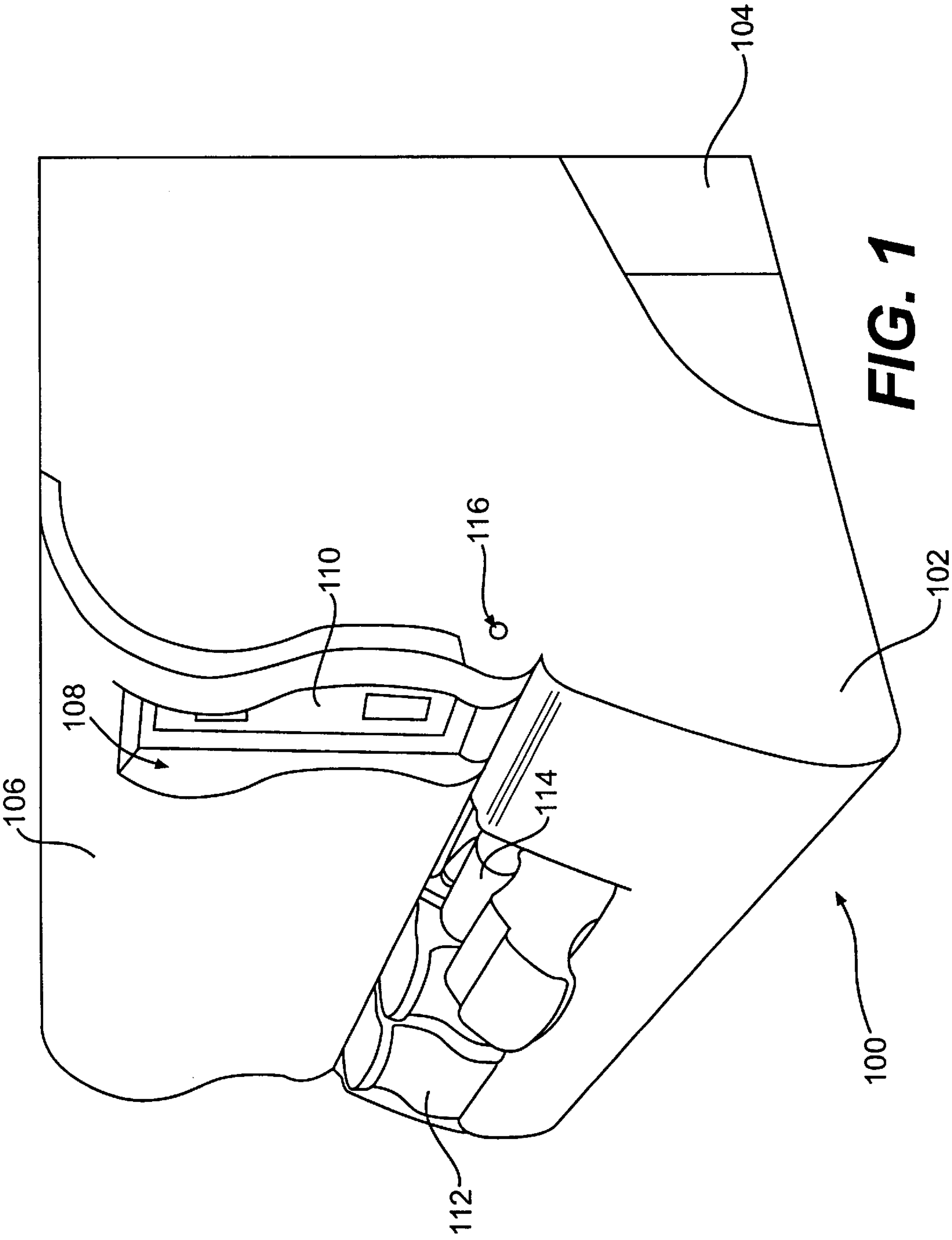
FIG. 1 is a three-quarter perspective view of a transportation vending machine according to the invention.

FIG. 1 depicts a transportation vending machine 100 having a front part 102, a rear part 104, a door 106, and cradles 112. A coin mechanism and/or debit card device 110 is located in the front part 102 and access thereto is found via an aperture 108 in the door 106. The front door 106 pivots about an axis of rotation corresponding to the dashed circle 116. The cradles 112 pivot (about an axis of rotation 316 (of FIG. 3) that is parallel to the axis 116) so as to convey a dispensed item, such as a container, e.g., of a soft drink. Mechanically controlled cradle technology is known, as in U.S. Pat. No. 4,576,272 to Morgan, Jr. et al., patented Mar. 18, 1986, U.S. Pat. No. 4,676,074 to Morgan, Jr. et al., patented Jun. 30, 1987, and U.S. Pat. No. 5,247,798 to Collard, Jr. (the Collard patent) the entire contents of each of which are hereby incorporated by reference.

Figure 2:
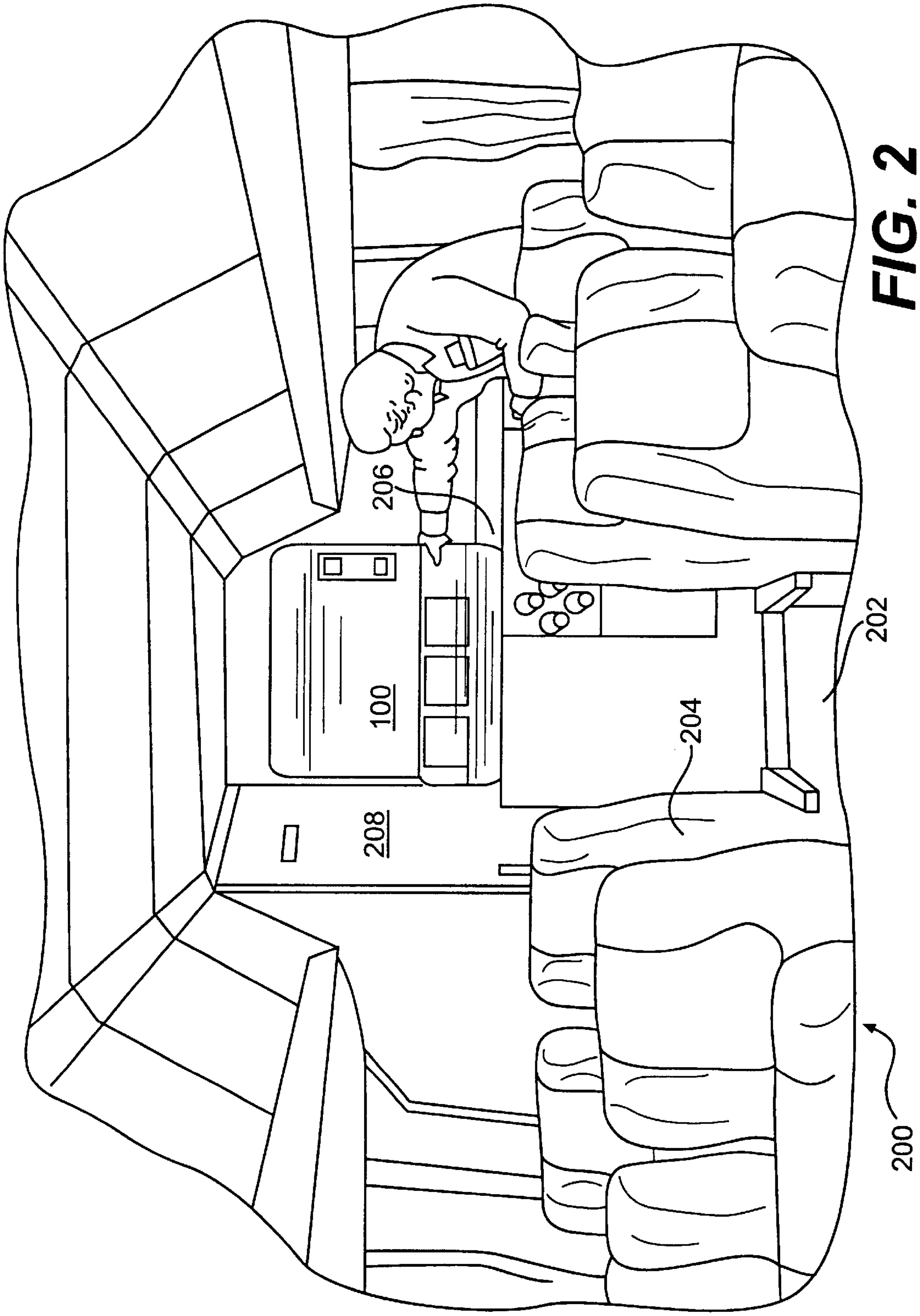
FIG. 2 is a view of the embodiment of FIG. 1 located within the likely environment of a coach bus.

FIG. 2 depicts the transportation vending machine 100 in a likely environment, a coach bus 200. The coach bus 200 has seats 204 on either side of an aisle 202. At the rear of the bus 200, after the last row of seats 204, there is a small shelf 206 adjacent to a lavatory door 208. The transportation vending machine 100, according to the invention, is small enough to fit on the shelf 206 without interfering with the motion of the door 208 to the lavatory.

Figure 3:
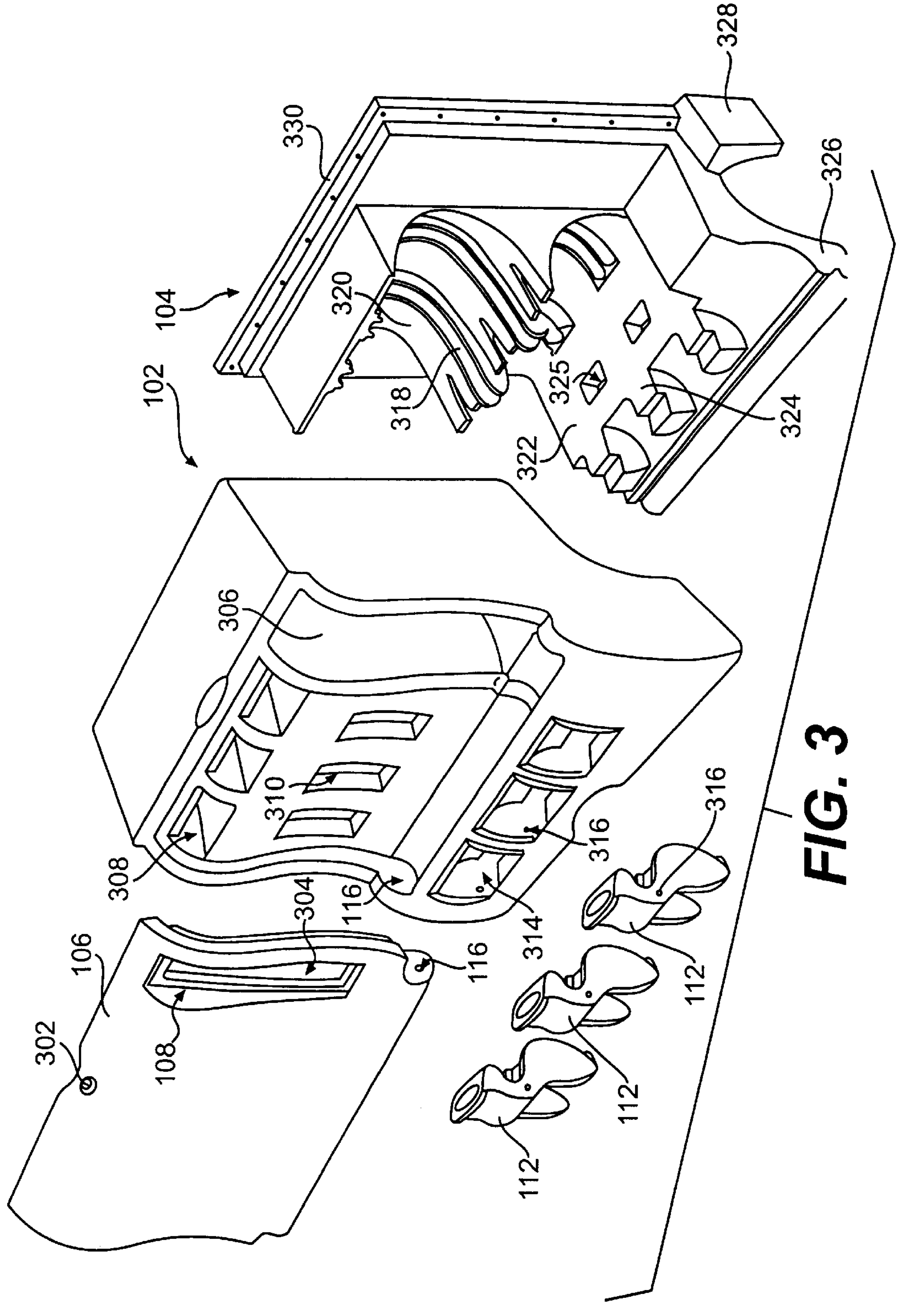
FIG. 3 is an exploded view of the embodiment of FIG. 1.

FIG. 3 is an exploded view of the transportation vending machine 100 of FIG. 1. FIG. 3 depicts each of the front part 102, the back part 104, the door 106, and the cradles 112 in more detail. Again, the axis of rotation for the door 106 is denoted by item 116. Also, the door 106 is depicted as having a lock mechanism 302 and an aperture 304, within the recess 108, corresponding to the coin mechanism and/or debit card device 110. An axis of rotation 316 for the cradles 112 is depicted.

Apertures 306 are depicted in part 102 where the coin mechanism and/or debit card device 110 will be inserted. Also, apertures 308 are depicted where containers 114 are inserted. Apertures 310 are provided through which an operator can gain access to the serpentine paths and correct jams. The axis of rotation 316 for the cradles 112 is also correspondingly depicted relative to the front part 102 in apertures 314.

The back part 104 is depicted as having serpentine surfaces 320. Alongside the serpentine surfaces 320 are formed serpentine rails 318 that are perpendicular to the serpentine surfaces 320. The front part 102 has a set of serpentine surfaces (not depicted in FIG. 3) corresponding to the serpentine surfaces 320 as well as a set of serpentine ridges (not depicted in FIG. 3) corresponding to the serpentine ridges 318. When the front part 102 and back part 104 are positioned against each other, the serpentine surfaces and serpentine ridges together define a corresponding number of serpentine paths through which flow the containers 114. The beginning of the serpentine paths corresponds to the apertures 308. The end of the serpentine paths correspond to the cradles 112.

Near the end of the serpentine paths is a preferably planar surface 322 against which is formed a portion of the cooling system, which will be described in more detail in regard to FIG. 5. The substantially planar surface 322 has apertures 325 and projections 324. The back part 104 has a front leg formation 326 and rear leg formations 328 (one of which is shown).

Figure 4:
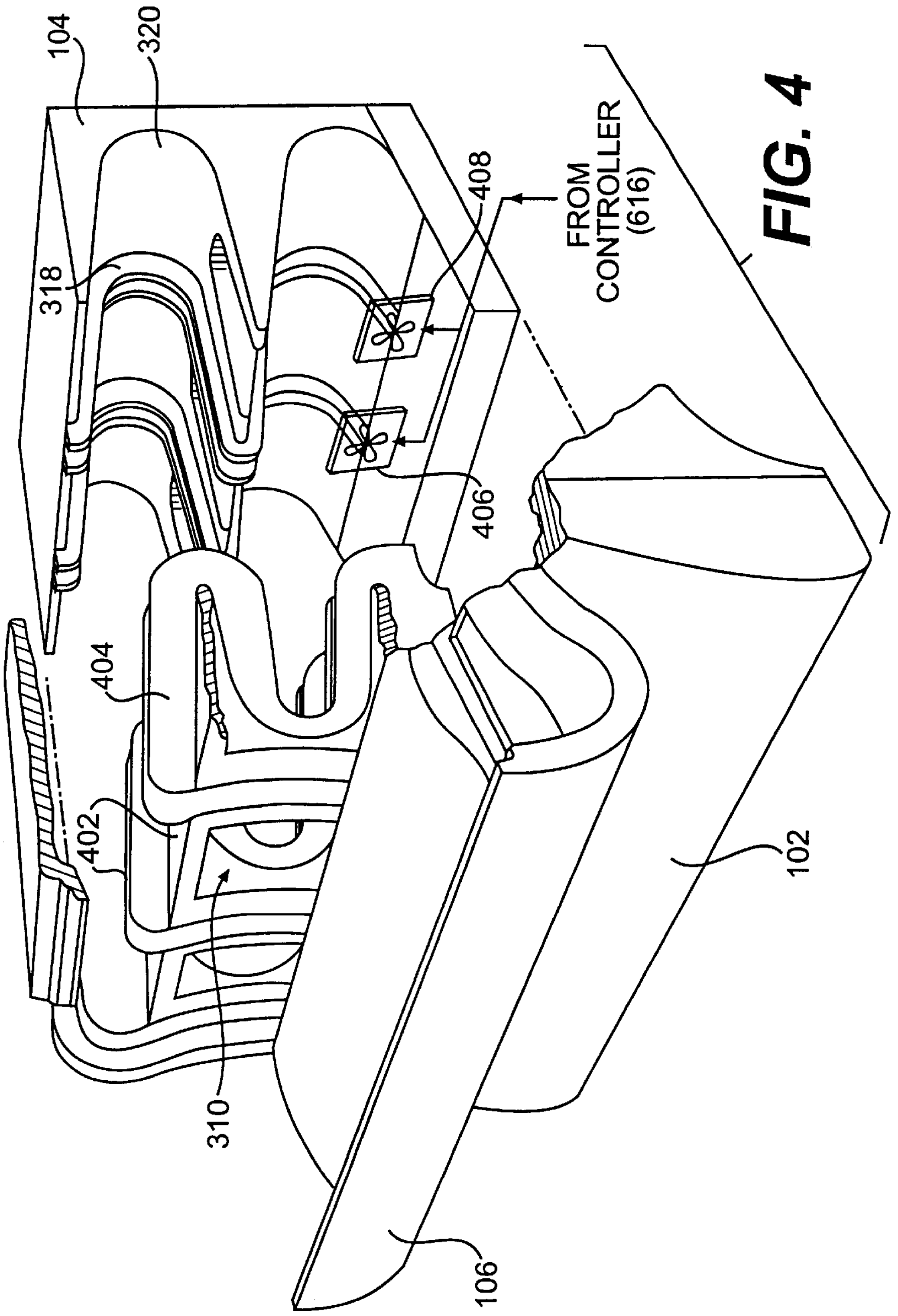
FIG. 4 is a three-quarter, cut-away view of the embodiment vending machine of FIG. 1.

FIG. 4 is a three-quarter, perspective, cut-away view of the embodiment of FIG. 1. FIG. 4 again depicts the serpentine surfaces 320 and the serpentine ridges 318 of the back part 104. Corresponding serpentine surfaces 402 and serpentine ridges 404 on the front part 102 are depicted as being complimentarily-shaped relative to the services 320 and ridges 318 of the back part 104. Again, when the back part 104 is positioned against the front part 102, the complimentarily-shaped surfaces 320 and 402, together with the complimentarily-shaped ridges 318 and 404 together define a plurality of serpentine paths.

When the serpentine ridges 404 on the front part 102 are positioned against the serpentine ridges 318 on the back part 104, the ridges 404 preferably engage the ridges 318 to form, in effect, a two-part serpentine conduit. Fans 406 and 408 are depicted in FIG. 4 as being located at the bottoms of the conduits, respectively. The fans 406 and 408 are controlled by a controller 616 (to be discussed below) to blow air in preferably opposite directions. Where the ridges 404 engage with the ridges 318, a poor seal is made. As a result, the air forced into the conduit can escape along the entire length of the conduit. However, the primary way in which the air is moved in not within the conduit. Rather, the air is simply agitated within the cavity of the transportation vending machine. The use of two or more fans is preferred but optional.

Figure 5:
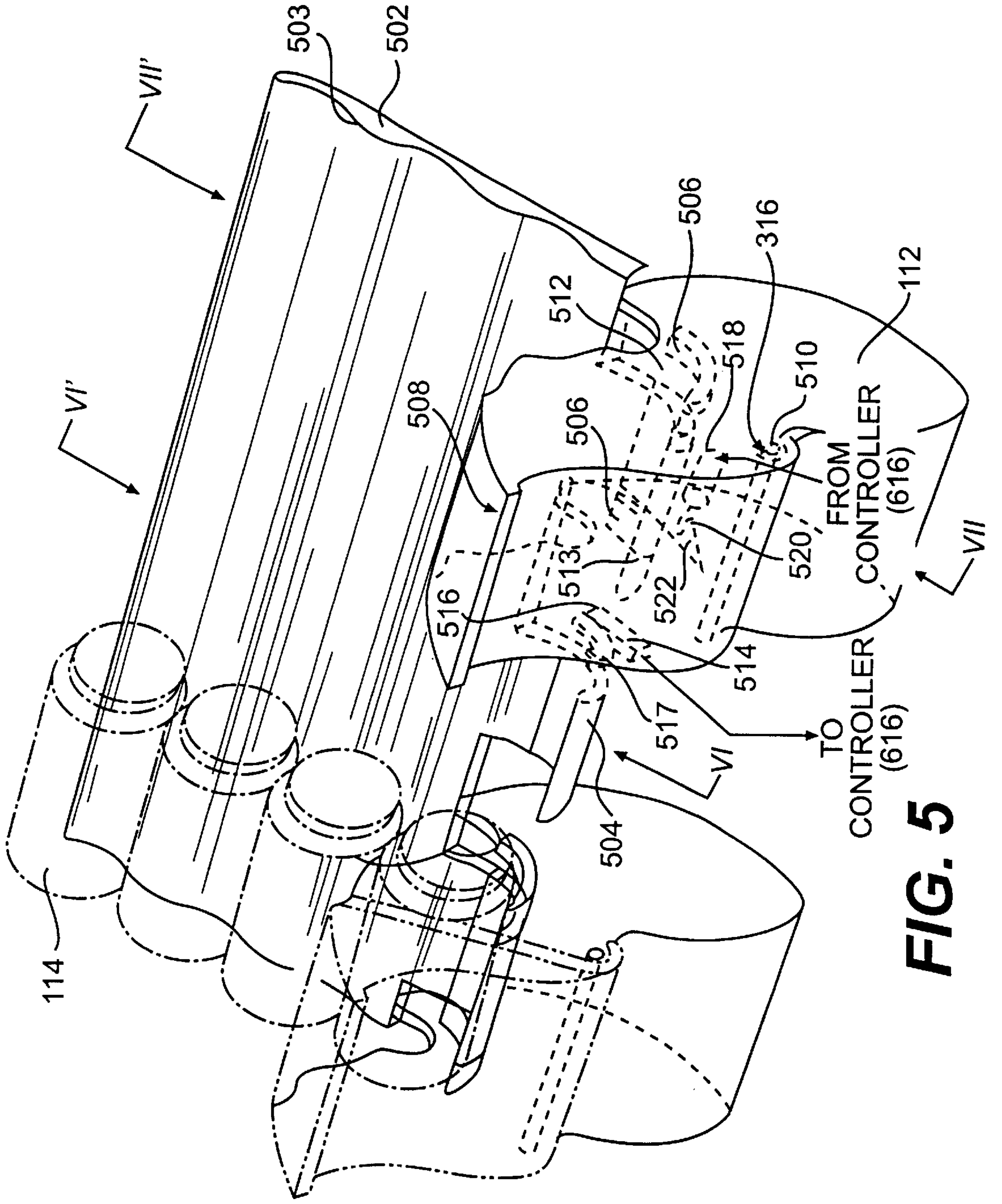
FIG. 5 is a more detailed view of the cradles and a portion of the cooling system of the embodiment of FIG. 1.

FIG. 5 depicts the cradles and a portion of the cooling system of the embodiment of FIG. 1 in more detail. The bottom of the serpentine paths is formed by a cooling plate 502 which can be flat, but preferably has a rippled surface 503, that lies on the planar surface 322. The radius of curvature of the ripples in the surface 503 corresponds to the radius of curvature of the containers 114 so that there is a relatively large amount of surface contact between the container 114 and the rippled surface 503, e.g., 20% of the circumference of the container 114, so as to promote cooling via conduction. However, the ripples are not so large as to significantly impede the flow of containers 114 through the serpentine paths toward the cradles 112.

The end of the serpentine paths correspond to tongues 504 of the cooling plate 502. The tongues 504 also have a radius of curvature corresponding to the radius of curvature of the containers 114. An even greater amount of surface contact exists between the container and the tongues 504 than between the ripples in the surface 503 and the containers 114. The tongues 504 terminate the rolling of the containers 114 down the serpentine path.

On either side of the tongues 504 are correspondingly curved ridges (or shoulders) 506 which, in effect, extend the curved surface defined by the tongues 504. However, the curved ridges 506 are parts of the cradles 112. When a customer grabs a handle 508 of the cradles 112 and rotates the cradles about the axis of rotation 316 (along which lies a pivot pin 510), the ridges 506 lift the container 114 off the tongue 504 and move it to a location outside the vending machine 100 where a customer can grasp the container 114.

Figure 10:
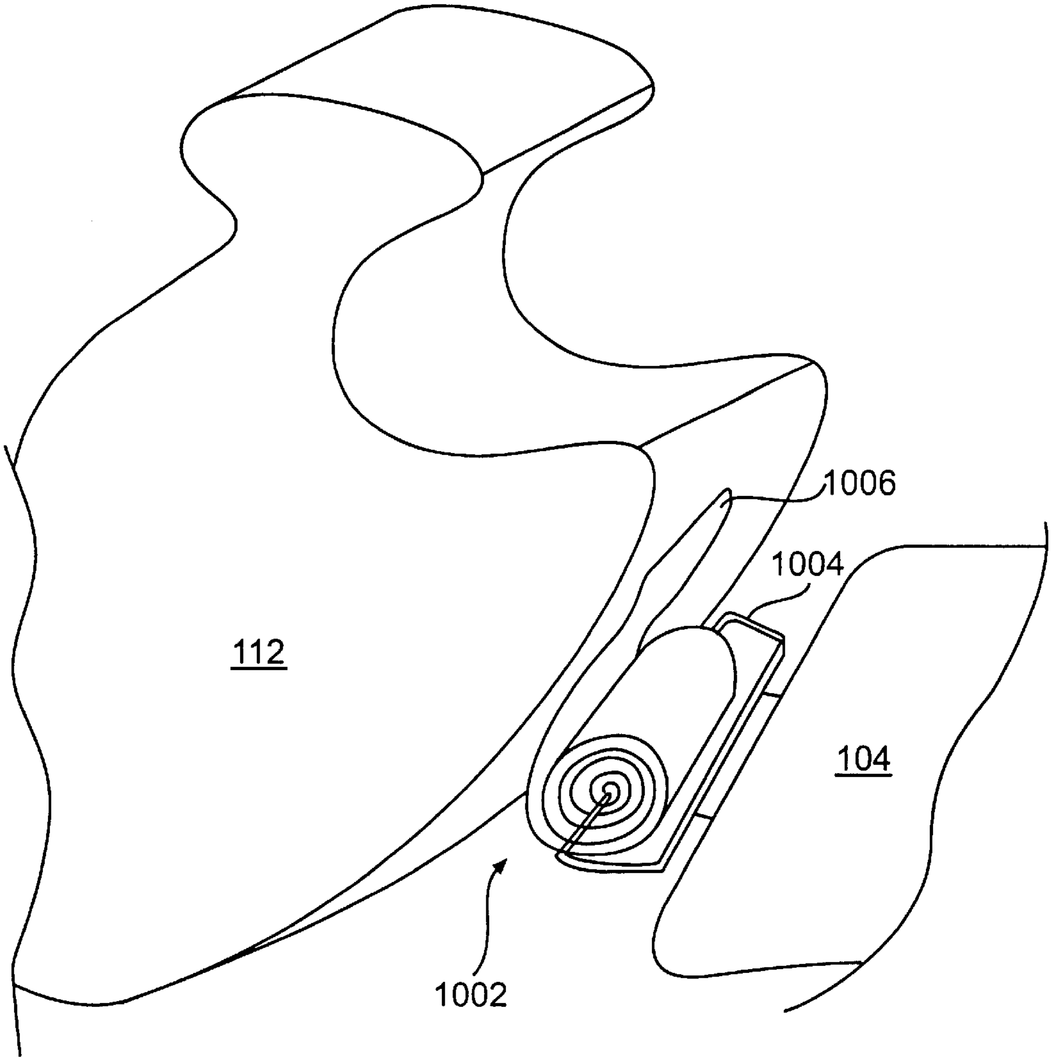
FIG. 10 is a perspective view of an embodiment technique for biasing a cradle to a closed position, according to the invention.

The cradles 112 can be weighted so as to return to a closed position under only the force of gravity. Alternatively, the cradles 112 could be biased to return to the closed position, e.g., with a spring. An example of a spring to bias the cradle to the closed position is depicted in the side perspective view of FIG. 10. In FIG. 10, a cradle 112 is biased by a tension spring 1002. The tension spring 1002 can be formed from a flat piece of plastic or metal rolled into a coil. A bail 1004 passes through the center of the spring 1002 and is attached to the back part 104 of the vending machine. The exposed end 1006 of the coil 1002 is attached to the cradle 112. As the cradle 112 is rotated, the coil 1002 unrolls. The effect is to produce a substantially constant amount of force biasing the cradle 112 to the closed position.

In FIG. 5, the gaps between each tongue 504 and the corresponding curved ridges 506 are asymmetric. In FIG. 5, the right hand gap 512 is depicted as being larger than the left hand gap 513. The larger size of the right hand gaps 512 permit a sensor 516, preferably a mechanical switch having a movable arm 517, to be positioned between the tongue 504 and the right hand curved ridge 506. The switch 516 is located so that when a can is resting in the tongue 504, the moveable arm 17 is depressed and the state of the switch is closed. When the cradle is rotated to withdraw a container, or when the column is empty, the switch 516 is biased so that the moveable arm 17 moves upward so that the switch 516 takes on the open state.

In FIG. 5, only one switch 516 has been depicted for simplicity. A signal line is depicted as going from the switch 516 to the controller 616 (to be discussed in more detail below).

FIG. 5 also depicts a solenoid 518 having a moveable pin 520 that engages within a triangular or sector-shaped recess 522 on one interior side of the cradle 112. Again for simplicity, only one solenoid 518 and recess 520 are depicted. A signal from the controller 616 is depicted as coming into the solenoid 518. When not energized, the pin 520 of the solenoid is extended so as to engage the recess 522. When the pin 520 is engaged in the recess 522, the cradle can be rocked a slight amount sufficient to lift the container far enough away from the tongue 504 so as to permit the switch 516 to take on the open state. However, the size of the triangular recess 522 is selected so that the cradle cannot be rotated far enough to permit a container to be withdrawn. When energized, the pin 520 of the solenoid 518 withdraws so as to no longer engage the recess 522, which permits the cradle 112 to be rotated enough to withdraw a container.

Figure 7:
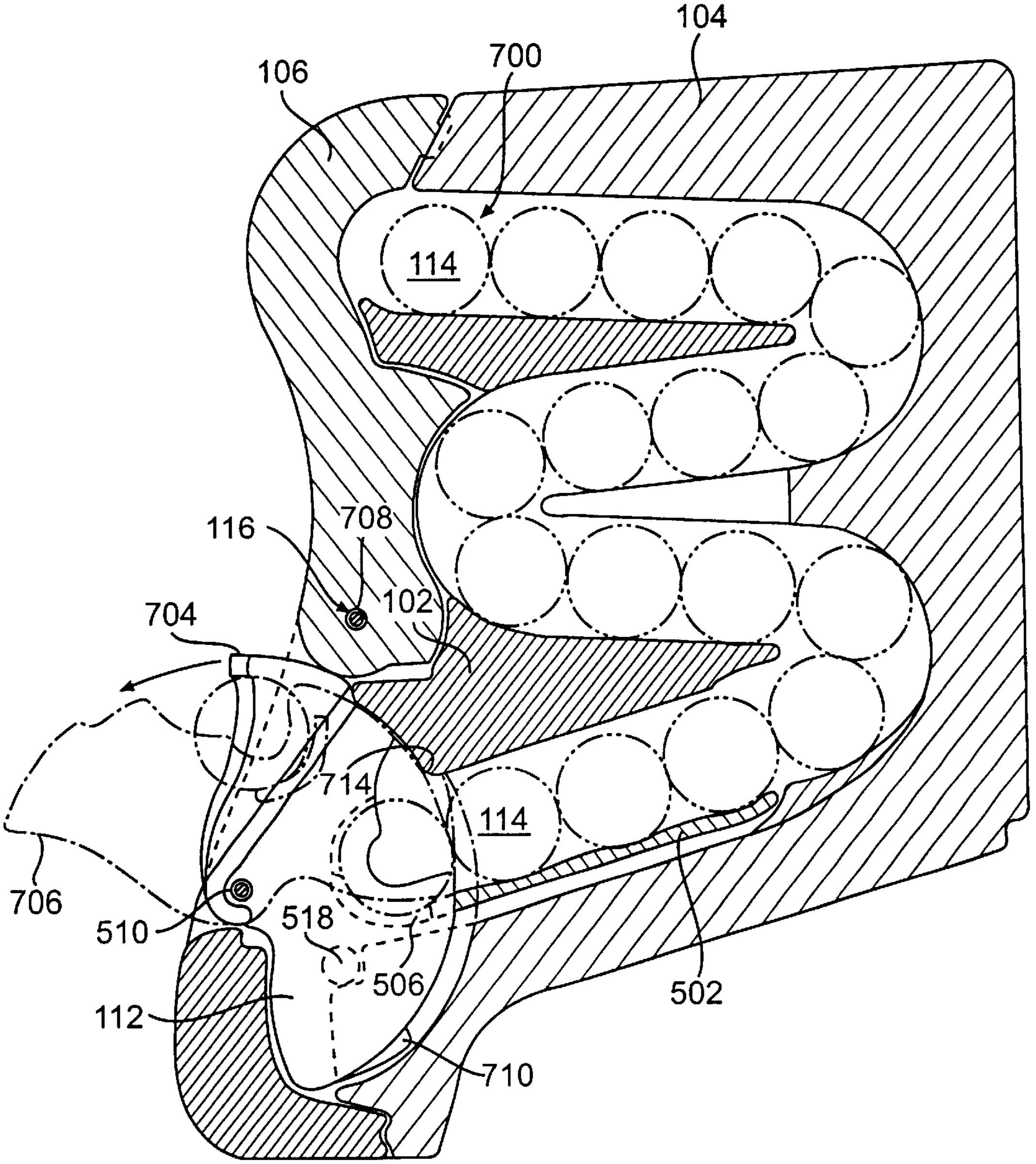
FIG. 7 is a cross-sectional view taken along view line VII–VII' of FIG. 5.

The solenoid 518 is preferably mounted on the back part 104 (see FIG. 7). The triangular recess 22 is preferably oriented so that the apex points toward the front of the vending machine while the base is pointed toward the back part 104. When the vending machine is disassembled, the front part 102 is separated from the back part 104. Such disassembly usually takes place with the power off. When the power is off, the solenoid 520 returns to the default position in which the pin 520 is fully extended. Having the base of the recess oriented toward the back part 104 permits the fully extend pin 520 to be slid away from the cradle 112.

Other shapes for the recess into which the pin 520 engages could be chosen. However, such a shape should have an opening like that of the triangular recess 522 in order to permit the front part 102 to be separated from the back part 104 even when the pin 520 is fully extended. An additional advantage of the choice and orientation of the triangular recess 522 is that the front part 102 and the back part 104 can be coarsely aligned and yet successfully slid together. In other words, the manner in which the sides of the triangular recess 522 taper toward the apex act to guide the pins 520 as the front part 102 is positioned against the back part 104.

Figure 6:
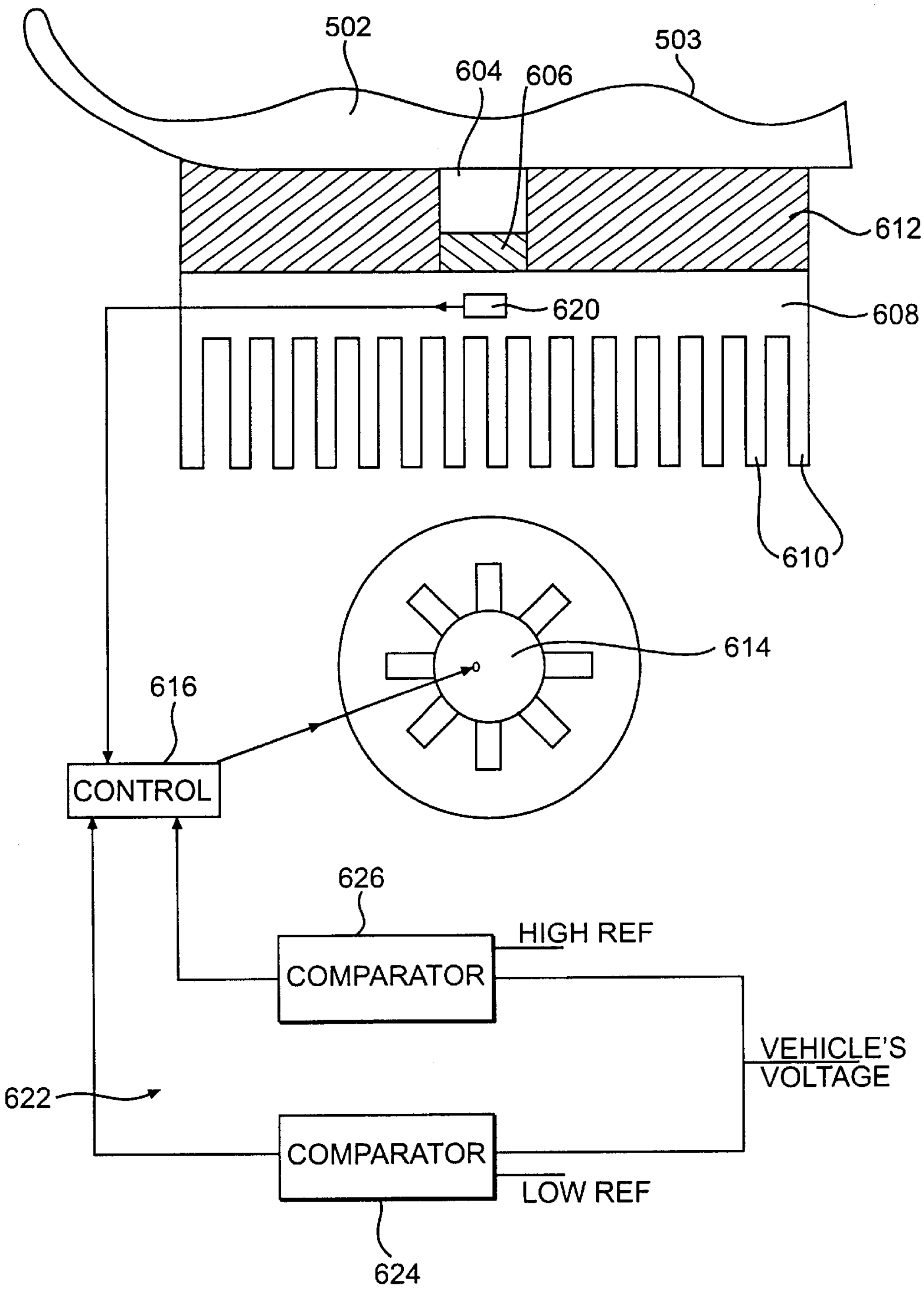
FIG. 6 is a cross-sectional view taken along view lines VI–VI' of FIG. 5.

FIG. 6 is a cross-section of FIG. 5 taken along the view lines VI–VI'. FIG. 6 depicts in more detail the cooling system of the transportation vending machine 100, which can be a compressor system, but is preferably a thermoelectric system. In FIG. 6, the cooling plate 502 is depicted as having a contact/bridge 604 that extends through one of the apertures 325 of FIG. 3. Two apertures have been depicted in FIG. 3. The desired number depends upon the cooling needs of a particular situation. The bridge 604 of the cooling plate 502 is a thermal conduit in contact with a thermoelectric device 606. The thermoelectric device 606 functions according to the Peltier Effect as a heat pump that draws heat energy from one surface of the device to the opposite surface. To reiterate, thermoelectric cooling devices are known, reliable cooling devices that function without the need of refrigerants or compressors. See, for example, U.S. Pat. No. 5,469,708 to Harrison et al., patented Nov. 28, 1995, the entire contents of which are hereby incorporated by reference. The foregoing incorporation by reference of the Collard patent is reiterated here also for, among other reasons, its disclosure of thermoelectric cooling technology. Preferably two thermoelectric devices are used, however only one is depicted in FIG. 6 for simplicity.

The thermoelectric device 606 is also in thermal contact with a heat sink 608 having fins 610 formed opposite to the side that is in contact with the thermoelectric device 606. An optional but preferred layer of insulation is depicted between the cooling plate 502 and the heat sink 608. Optionally, and preferably, the layer of insulation 612 also protects the thermoelectric device 606 from condensation. A fan 614 is optionally, and preferably, provided for forcing air past the fins 610 of the heat sink 608. Also optionally, a temperature sensor 620 is positioned on or near the heat sink and operatively connected to a controller 616 for selectively actuating the cooling fan 614.

FIG. 6 also depicts the power quality monitoring circuitry 622 according to the invention. The vending machine according to the invention is intended to be used on a vehicle. The thermoelectric devices 606 and the fan 614 consume a significant amount of power. In a vehicle that is operating normally, the load represented by the thermoelectric devices 606 and the fan 614 does not present a problem. However, if the vehicle is malfunctioning, then this electrical load represented by the vending machine can be a problem.

A vending machine on a vehicle is a luxury, not a necessity. Hence, the power quality determination circuitry 622 is provided to for the purposes for shutting down the vending machine if the power supplied by the vehicle is too low. In addition, if the power supplied by the vehicle is too high, then the circuitry 622, in conjunction with the controller 616, can shut down the vending machine.

The circuitry 622 includes a first comparator 624 and a second comparator 626. The comparator 624 receives a low reference voltage and the vehicle voltage. If the vehicle voltage drops below the low reference voltage, then the controller senses the change in output from the comparator 624. The comparator 626 receives a high reference voltage and the vehicle voltage. If the vehicle voltage is greater than the high reference voltage, then the controller 616 senses the change in output of the comparator 626.

The processing by the controller of the signals from the comparators 624 and 626 is debounced and exhibits hysterisis. It is debounced in the sense that the controller 616 samples these signals, e.g., every ten milliseconds. If the comparators 624 and 626 provide five consecutive samples indicating that the vehicle voltage is too low or too high, respectively, then the controller recognizes a true undervoltage or true overvoltage situation, respectively. Otherwise, the too low or too high indications are dismissed as transient.

If the controller 616 determines that the voltage is too low, then the controller shuts down the thermoelectric devices 606 and the fans 614, disables the coin mechanism and controls the indicator on the vending machine to appear as though is off, as in step 908 of FIG. 9A, (discussed below). To exhibit hysterisis, the controller 616 will not restore power to the thermoelectric devices 606 and the fans 614, reactivate the coin mechanism and reenergize the indicator for at least 30 seconds. A comparable hysterisis scenario is provided in the case where the controller senses a true overvoltage situation.

FIG. 7 depicts a cross-sectional view along the view lines VII–VII' of FIG. 5. It is noted that items not depicted in FIG. 5 (for simplicity) have been depicted in FIG. 7, such as the front and back parts 102 and 104, and the door 106. FIG. 7 depicts the serpentine path 700 created between the serpentine surfaces 320 and 402, and the serpentine ridges 318 and 404, when the parts 104 and 102, respectively, are positioned against one another. An example of eighteen (18) containers 114 are depicted as capable of being stored in the serpentine path 700. In FIG. 7, the closed position for the cradle 112 is depicted in full-lines, while an open position of the cradle 112 is depicted by dashed-lines denoted by item 706. The cradle 112 includes a flange 710 formed so as to stop motion of the cradle 112 about a pivot pin 712 when the flange 710 comes into contact with a corner 714 of the front part 102. A pivot pin 708 lying parallel to the axis of rotation 116 is depicted as attaching the door 106 to the front part 102.

Figure 8:
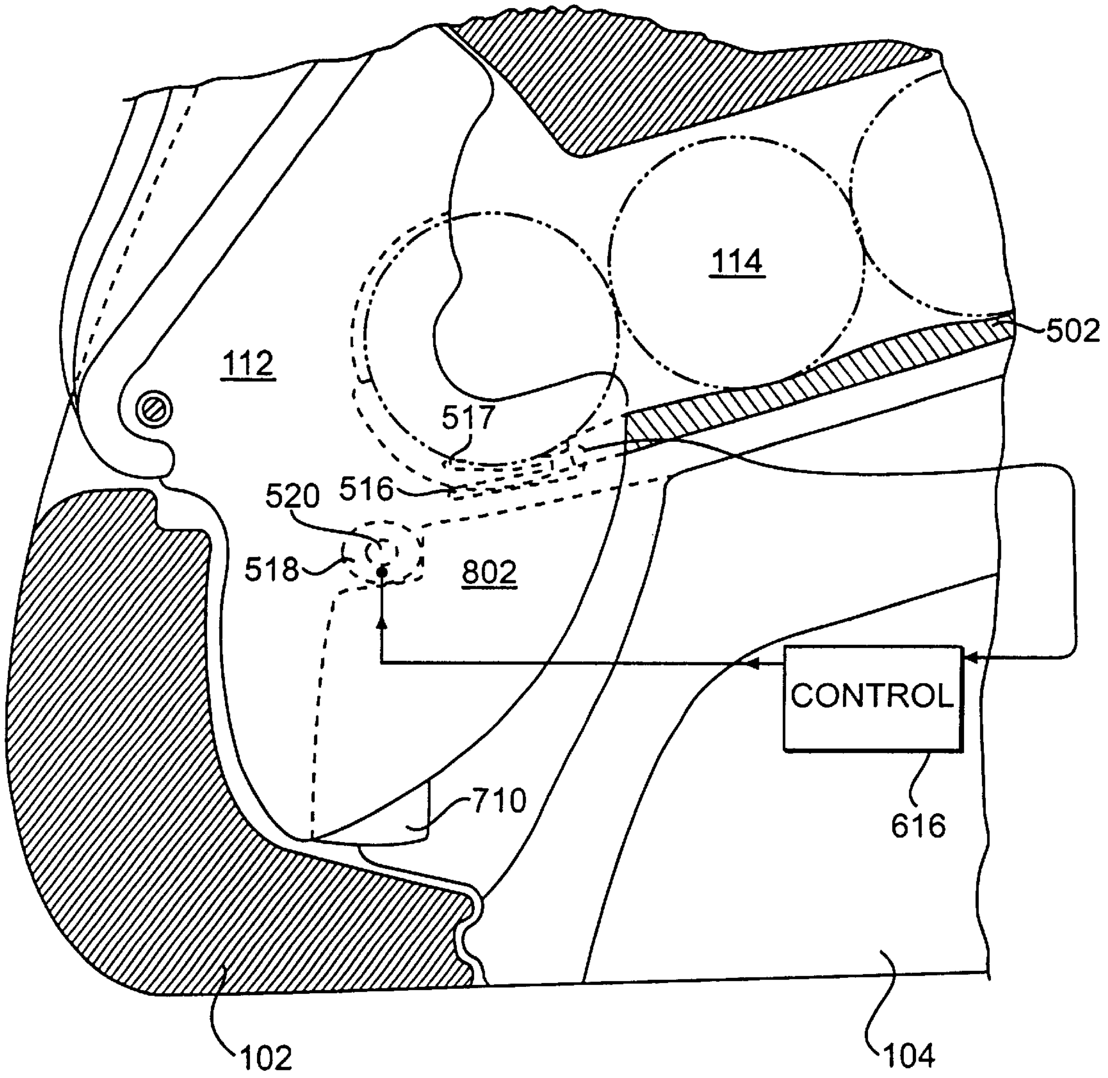
FIG. 8 is a more detailed view of an aspect of the cradle depicted in FIG. 7.

FIG. 8 depicts the interlock aspect of the cradle of FIG. 7 in more detail. In FIG. 8, the cradle 112 is in the closed position so that the moveable arm 517 of the switch 516 is also in the closed position. The solenoid 518 is shown as being positioned on a projection 802 of the back part 104.

Figure 9A:
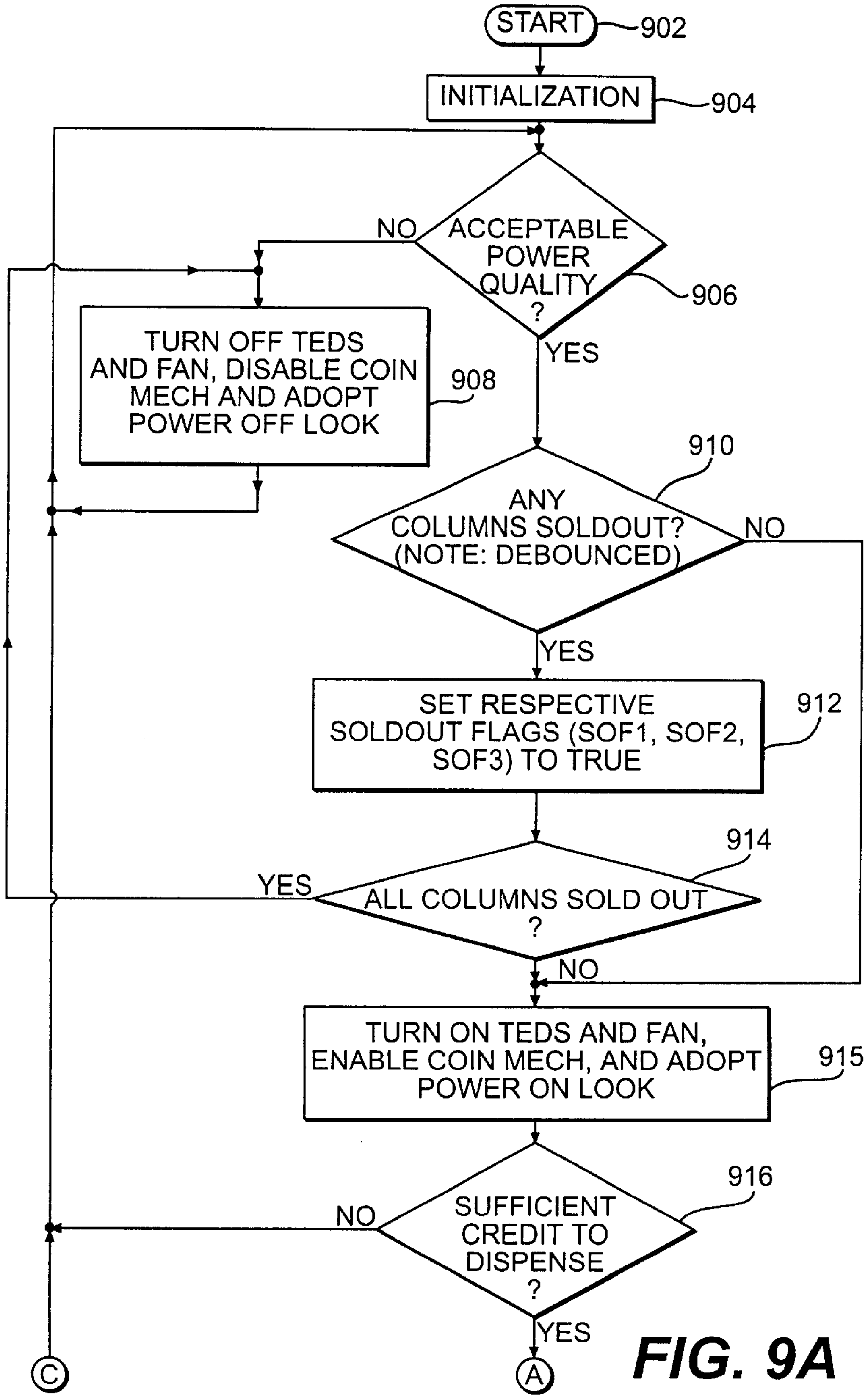
FIGS. 9A, 9B and 9C are a flowchart representing some of the processing performed by the vending machine according to the invention.
Figure 9B:
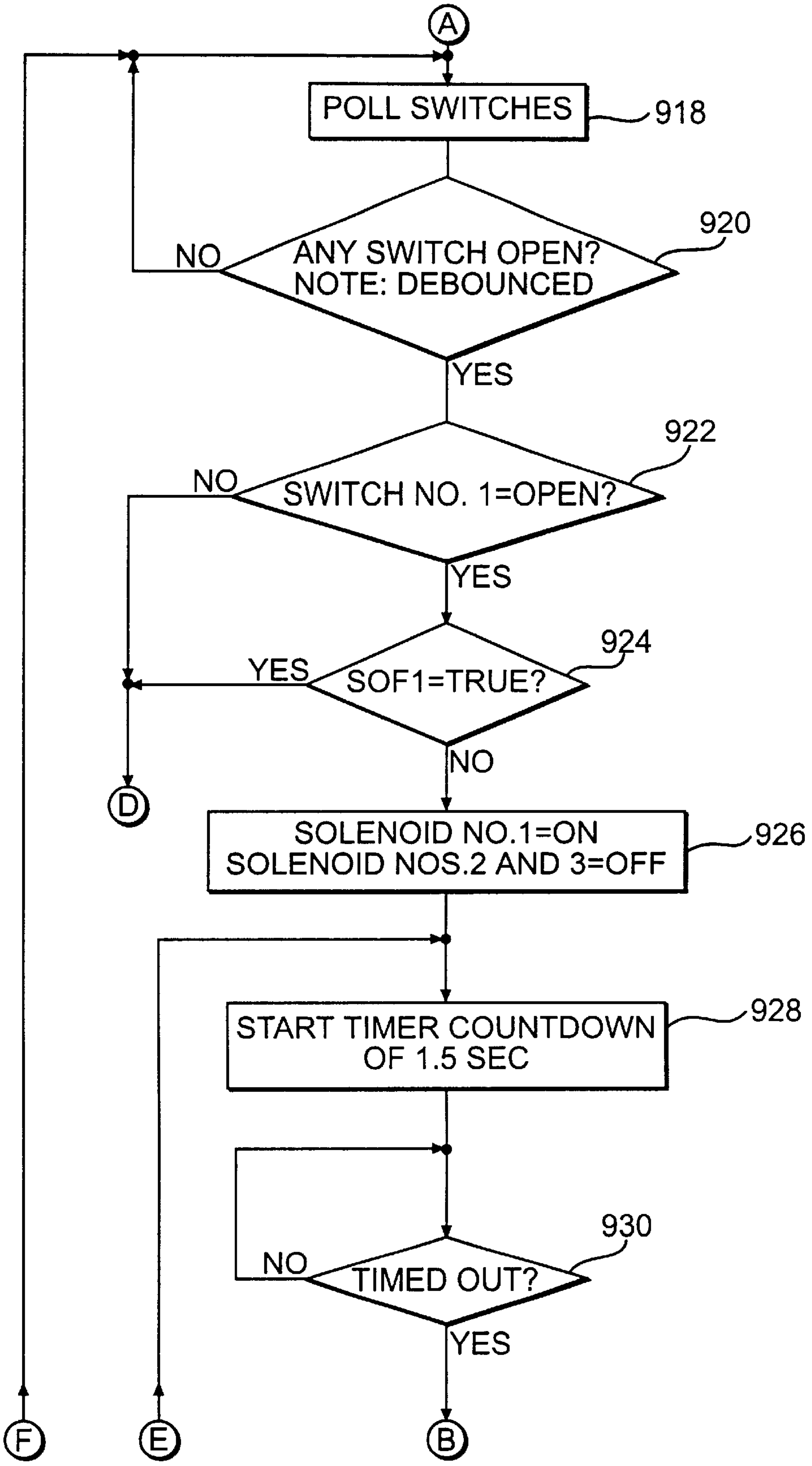
Figure 9C:
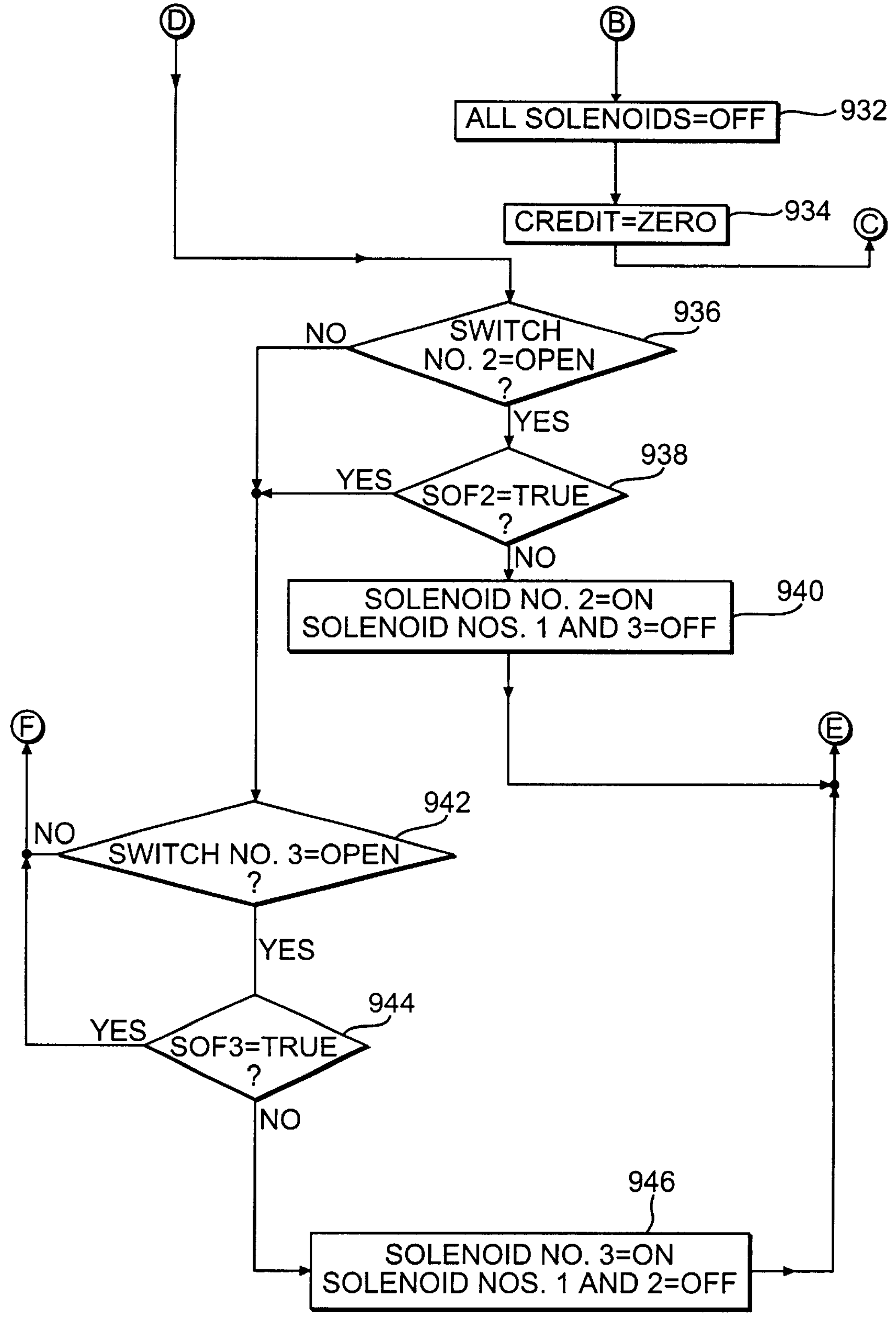

FIGS. 9A, 9B and 9C are a flow chart representing some of the processing performed by the controller 616. Flow through the chart begins at step 902 and proceeds to the initialization step 904. This can include checking the status of the coin mechanism, the thermoelectric device (TEDs) and determining the prices of the products being sold. For example, the controller can be provided with post-jumpers (not shown) or dual inline package (dip) switches (not shown), i.e., low cost non-volatile memory, the configuration of which can represent the price of the vended products.

From the initialization step 904, flow proceeds to the decision step 906, where it is determined whether the power being supplied to the vending machine is of acceptable quality (see FIG. 6 and associated description for further details). If the power is not of acceptable quality, flow proceeds to step 908, where the thermoelectric devices and the fan are turned off, the coin mechanism is disabled and the indicator lights (not shown) on the vending machine are made to appear as though power to the machine is off. Flow proceeds from step 908 back to the decision step 906 to await the resumption of acceptable power quality.

If the power quality is acceptable, flow proceeds from step 906 to the decision step 910, where it is determined whether any of the columns are sold out. If so, flow proceeds to step 912 where the respective sold out flags SOF1, SOF2 and SOF3 are set to true if necessary. Previously, during the initialization step 904, these flags had all been set to false. Flow proceeds from step 912 to the decision step 914, where it is determined whether all of the columns are sold out. If so, flow proceeds back to step 908. If not all of the columns are sold out, then flow proceeds to step 915, where the thermoelectric devices and the fan are turned on, the coin mechanism is enabled and the indicator lights (not shown) on the vending machine are made to appear as though power to the machine is on. From step 915, flow proceeds to the decision step 916. Back at step 910, if it is determined that none of the columns are sold out, flow proceeds directly to step 915.

It is noted that the determination at step 910 is debounced, i.e., the process is sufficiently sophisticated to filter out noise. For example, the controller 616 actually samples the state of the switches 516 every ten milliseconds, preferably sampling only one switch 516 at a time in a polling fashion. If the controller 616 receives five consecutive open state indications from a switch, then that switch is considered to truly be open. Similarly, if the controller 616 receives five consecutive closed state indications, then that switch is considered to be truly closed. On a vehicle, bumps in the road are transmitted through the suspension system to the contents and occupants of the vehicle. This transmitted noise may cause the cradles 112 to rotate enough to momentarily open the switches 516, especially in view of the ability of the cradles 112 to rotate slightly when the moveable pins 520 are extended to engage the triangular recess 522.

At the decision step 916, it is determined whether a customer has deposited sufficient credit via the coin mechanism in order to dispense a product/container. If not, flow proceeds back to step 906. If sufficient credit has been deposited, then flow proceeds to step 918 of FIG. 9B, where the controller 616 again polls the switches 516. Flow proceeds from the polling step 918 to the decision step 920, where it is determined whether any switch has been opened. If none of switches are open, then flow proceeds back to the polling step 918. However, if at least one of the switches is open, flow proceeds from step 920 to the decision step 922.

The determination at step 920 is a debounced determination for the purposes of filtering out road-vibration-induced false switch indications. Similar to the description above, e.g., a truly open switch is one for which the controller 616 receives five consecutive open state indications, while a truly close switch is one for which the controller 616 receives five consecutive closed state indications.

In the decision step 922, it is determined whether switch number 1 is open. If not, flow proceeds to step 936 of FIG. 5C. If switch number 1 is opened, then flow proceeds to the decision step 924, where it is determined whether the sold out flag for serpentine column 1, namely SOF1, has been set to the logical true state. If so, i.e., if the column which switch number 1 monitors is sold out, then flow proceeds to step 936 of FIG. 9C. However, if SOF1 is set to the logical false state, i.e., if the corresponding column is not sold out, then flow proceeds to step 926, where the solenoid number 1 is energized, i.e., is set on, and the solenoids number 2 and 3 are set to the off state, which is the default state.

Flow proceeds from step 926 to step 928, where a count down timer is set to 1.5 seconds and is started counting down. Flow proceeds from step 928 to the decision step 930, where it is determined whether the timer has finished counting. If not, flow loops back to the step 930. If so, flow proceeds to step 932 of FIG. 9C, where all of the solenoids are set to the off state. In other words, once a customer has deposited sufficient credit in the coin mechanism and has chosen one of the cradles, here cradle number 1, then the controller 616 gives the customer 1.5 seconds in which to rotate the cradle far enough to withdraw the products/container. However, the timer will not start until the customer moves one of the cradles 112.

Flow proceeds from step 932 to step 934, where the credit is reset to zero. Flow proceeds from step 934 to step 906 of FIG. 9A. As mentioned above, flow can proceed from steps 922 or step 924 to the decision step 936, where it is determined whether switch number 2 is open. If not, flow proceeds to step 942. However, if switch number 2 is open, then flow proceeds to the decision step 938, where it is determined whether the sold out flag for the serpentine column corresponding to switch number 2, i.e., SOF2, is set to the true state. If the second column is not sold out, then flow proceeds to step 940, where the solenoid number 2 is set to the on state, i.e., solenoid 2 is energized, while the solenoid numbers 1 and 3 are set to the off state. Flow proceeds from step 940 to step 928 of FIG. 9B.

As noted above, flow can proceed from steps 936 and 938 to the decision step 942, where it is determined whether switch number 3 is open. If not, then flow proceeds to step 918 of FIG. 9B. However, if switch number 3 is open, then flow proceeds to the decision step 944, where it is determined whether the sold out flag, SOF3, for the serpentine column corresponding to the third switch is set to the true state. If so, i.e., if the serpentine column corresponding to the third switch is sold out, then flow proceeds again to step 918 of FIG. 9B. However, if the third column is not sold out, then flow proceeds to step 946 where the solenoid number 3 is set to the on state, i.e., is energized, while the solenoid numbers 1 and 2 are set to the off state. Flow proceeds from step 946 to step 928 of FIG. 9B.

The process of FIGS. 9A–9C ensures that only one product/container is dispensed for one purchase price. The time of 1.5 seconds was chosen to be short enough in duration to prevent a customer from withdrawing multiple products/containers. However, the time of 1.5 seconds is also long enough to protect a slippery-fingered customer from loosing his credit if the drawer slips out of his fingers after he first moves it. The time of 1.5 seconds could be either increased or decreased depending upon the environment in which the vending machine is intended to be located.

The process of FIGS. 9A–9C assume that the price of the product/containers in each of the three columns will be the same. However, the prices could be different. One of ordinary skill in the art would understand the minor modifications to the process of FIGS. 9A–9C that would be needed for such different pricing.

The location of the switches 516 has been chosen so that switch 516 serves a dual purpose. First, upon initialization, the switches 516 are indicative of whether any of the columns are sold out of product/containers. Second, after sufficient credit has been deposited by a customer, the switches 516 indicate whether the cradles 112 have been moved. Separate sensors could be provided to indicate the sold out status of a serpentine column and to indicate whether the cradle has been moved. However, in the very cost sensitive vending machine industry, the cost savings achieved by the dual functions fulfilled by careful location of each switch 516 is an advantage.

The controller 616 could be implemented with numerous commercially available processors. However, in the very cost sensitive vending machine industry, it is preferable to choose a processor that is low in cost. An example of a suitable processor is the model number PIC16C57 processor from the PICmicro™ family of microcontrollers marketed by Microchip Technology Inc.

If the cradle 112 is open after the timer has timed out, causing the associated solenoid to be deenergized, the cradle 112 can be returned to the closed position. The solenoid 518 and the cradle 112 are arranged as a one-way catch or ratchet so that the cradle can always return to the closed position regardless of whether the solenoid is energized or not, i.e., whether the vending machine defaults to a locked configuration.

The PIC16C57 processor is an EPROM/RAM-based 8 bits CMOS programmable micro-controller. The controller 616 could also be implemented as a programmable logic array (PLA). However, because the vending machine industry is very cost sensitive, the PLA implementation is currently less preferred than the use of the PIC16C57 microcontroller.

To provide a robust design at a minimum cost to form the parts 102 and 104 of the transportation vending machine 100 according to the invention, the parts 102 and 104 are preferably formed of molded plastic, and more preferably formed of rotational-molded (or rotomolded) plastic. Rotomolding of plastic is a known technique for making large plastic components that are hollow inside. The voids (not depicted) inside the parts 102 and 104 can be filled with a thermally insulating material. Similarly, the door 106 can be formed by injection-molding, or more preferably by, rotomolding, and preferably will also be filled with a thermally insulating material. Filling the voids of the parts 102, 104, and 106 with the thermally insulating material helps preserve the containers 114 in a refrigerated state. Alternatively, the insulating material in the form of sheet can be provided on the inside surfaces of the parts 102, 104, and 106.

The door 106 is arranged on the front surface of the front part 102 so that restocking can take place by simply opening the door sufficiently to gain access to the apertures 308, or to the apertures 310 in the event of a jam in the serpentine path 700. It is to be recalled that prior art vending machines required the entire front face of the vending machine to be opened. Here, the door 106 can be operated without interfering with the cradles 112. Moreover, the door 106 can be fully opened in a smaller volume than could the entire face of the machine, which is especially useful in, e.g., the cramped confines of a vehicle.

The thermoelectric cooling system is very efficient at maintaining the containers at a predetermined temperature, but is not especially efficient at cooling the containers from room-temperature down to a desired serving temperature. Thus, it is preferable that the containers 114 be pre-chilled prior to being inserted into the serpentine paths 700 via the apertures 308.

If the containers 114 remain in contact with the rippled surface 503 of the cooling plate 502 for an extended period of time, the thermoelectric cooling system is capable of freezing those containers 114. Thus, the fans 902 and 904 are provided to circulate air within the interior of the vending machine 100. This has the effect of retarding the freezing of the containers 114 that are in contact with the rippled surface 503 of the cooling plate 502, while at the same time, providing cooled air to the container 114 in the upper portion of the serpentine paths 700. Again, the cooling process can also be controlled (optionally but preferably) via the selective actuation of the cooling fan 614 in response to the sensor 620 sensing a predetermined temperature on the heat sink 608. Similarly, if the temperature sensed by the sensor 620 drops below another predetermined temperature, the controller 616 can turn off the fan 614.

The invention has been described in terms of a vending machine (or vender). However, many aspects of the vending machine are applicable to a cooling dispenser (or cooler). For example, it is possible to provide the two-piece molded serpentine-path-based dispenser in connection with a cooler rather than a vending system. Similarly, the thermoelectric cooling system can be provided for a dispenser having cradles without the provision of the associated vending machine system that includes the interlock controller. The example of three serpentine columns has been presented because, for dispensing soft drink containers, this fits well within the space typically available on a coach bus. However, any number of serpentine columns can be implemented.

While the invention is especially suited to a cooling dispenser or vending machine that is to be used on a vehicle such as a coach bus, plane, train, or limousine, it is also suitable for a non-transportation environment such as a small kitchen or break room in an office or a recreation room or bar in a home.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

What is claimed is:

1. A vending machine for vending items, said vending machine comprising:

a dispenser to store and dispense said vended items, said dispenser including a plurality of motion-controllable cradles, each of said cradles being operable to convey one of said items to a customer;

a plurality of sensors to sense open or closed states of said cradles, respectively;

a controller to permit, upon the payment of a fee, any one said plurality of cradles to be opened, said controller being responsive to said sensors to determine when a first one of said cradles is partially opened, and said controller being operable to permit said first cradle to be fully opened while preventing the other ones of said plurality of cradles from being opened enough to withdraw an item so as to restrict items dispensed to one item per fee; and a payment device to receive payment of a fee from a customer and a plurality of selectively extendable pins that selectively engage with said cradles to prevent said cradles from being rotated, respectively, enough to permit withdrawal of an item, wherein said sensors are switches that have a first state when said cradle is in a closed position and a second state when said cradle is in a partially opened state; and wherein, upon said payment of said fee, said controller is operable to determine if one of said sensors has changed from said first state to said second state, permit a cradle corresponding to said changed sensor to be opened for a predetermined duration, and cause all of said cradles to lock after expiration of said predetermined duration.

2. The vending machine of claim 1, wherein vending is accomplished without the provision of selection buttons by which a customer could indicate a desired item.

3. The vending machine of claim 1, wherein said controller is operable to use said switches to indicate motion of said cradles, but also to indicate when corresponding serpentine columns are sold out of product.

4. A dispenser to store and dispense items, said dispenser comprising:

a surface facing a recipient of one of said items;

a plurality of openings in said surface, each of said openings being operable to convey one of said items; and a door in said surface, said door being operable to permit at least one of a stock of said items to be replenished and accessed for services of said dispenser.

5. The dispenser of claim 4, wherein each of said openings is connected to said door via a path.

6. The dispenser of claim 5, wherein said path is a serpentine path.

7. The dispenser of claim 4, wherein each of said openings is occupied by a motion-controllable cradle.

8. A vehicle vending machine for storing, cooling and vending a plurality of items on a vehicle, said vehicle vending machine comprising:

a dispenser to store and dispense said plurality of items, said dispenser including at least one path over which said plurality of items moves through said dispenser;

a cooling device to maintain a refrigerated state of said plurality of items in said dispenser; and a vend system to control the flow of said items through said path of said dispenser, said vend system including a power quality circuit to interrupt power to said cooling device if the power supplied from the vehicle is of unacceptable quality.

9. The vending machine as in claim 8, wherein a portion of said path is a thermally conductive portion having a rippled surface complimentarily-shaped to said items to promote conductive cooling.

10. The vehicle vending machine of claim 8, wherein vending is accomplished without the provision of selection buttons by which a customer could indicate a desired item.

11. The vehicle vending machine of claim 8, wherein said cooling device is a thermoelectric device.

12. A transportation cooler for storing, cooling and dispenser a plurality of items on a vehicle, said transportation dispenser comprising:

a dispenser to store and dispense said plurality of items, said dispenser including a path by which each one of said plurality of items moves through said dispenser;

a cooling system, powered by an electrical system of said vehicle, to maintain a refrigerated state of said plurality of items in said dispenser;

an undervoltage circuit to sense an undervoltage condition when voltage supplied by the vehicle electrical system drops below a reference voltage; and a controller to remove said cooling system from said vehicle electrical system when said undervoltage condition is sensed.

13. The transportation cooler of claim 12, wherein said controller is operable to restore power to said cooling system a predetermined time after said power is removed such that power restoration exhibits hysterisis.

14. The transportation cooler of claim 12, wherein said reference voltage is a first reference voltage, said dispenser further comprising:

an overvoltage circuit to sense an overvoltage condition when voltage supplied by said vehicle electrical system rises above a second reference voltage;

wherein said controller is operable to disconnect said cooling system from said vehicle electrical system when said overvoltage condition is sensed.

15. The transportation cooler of claim 12, wherein said cooling device includes at least one of a thermoelectric device and a fan.

16. A transportation vending machine for vending items on a vehicle, said transportation vending machine comprising:

a dispenser to dispense said items, said dispenser including at least one path over which said plurality of items moves through said dispenser;

at least one sensor to sense whether one of said items is in a predetermined location on said at least one path, respectively;

a controller to receive a signal from said at least one sensor and to filter out noise in the at least one sampled signal in order to deal with spurious signals caused by vibration of said vehicle.

17. The transportation vending machine of claim 16, wherein said sensor is a switch.

18. The transportation vending machine of claim 16, wherein said controller is operable to sample said signal from said at least one sensor and to treat a continuous preset number of samples satisfying a predetermined condition as a true reading of said predetermined condition.

19. The transportation vending machine of claim 16, further comprising at least one rotatable cradle terminating said at least one path, respectively, said at least one sensor being positioned to sense rotation of said at least one cradle, respectively.

20. The transportation vending machine of claim 19, wherein said at least one sensor is located such that a signal therefrom can be used by said controller to determine rotation of said cradle and to determine whether said at least one path is sold out of items, respectively.

21. A vending machine for vending items, said vending machine comprising:

a dispenser to store and dispense said vended items, said dispenser including a plurality of motion-controllable cradles, each of said cradles being operable to convey one of said items to a customer;

a plurality of sensors to sense open or closed states of said cradles, respectively;

a controller to permit, upon the payment of a fee, any one said plurality of cradles to be opened, said controller being responsive to said sensors to determine when a first one of said cradles is partially opened, and said controller being operable to permit said first cradle to be fully opened while preventing the other ones of said plurality of cradles from being opened enough to withdraw an item so as to restrict items dispensed to one item per fee; and a plurality of locking devices for said plurality of cradles, respectively, wherein upon loss of power, said plurality of locking devices default to a state in which said plurality of cradles are locked so as to prevent withdrawal of items.

22. The vending machine of claim 21, wherein said plurality of locking devices are solenoid-activated pins.

23. A vending machine for vending items, said vending machine comprising:

a dispenser to store and dispense said vended items, said dispenser including a plurality of motion-controllable cradles, each of said cradles being operable to convey one of said items to a customer;

a plurality of sensors to sense open or closed states of said cradles, respectively; and a controller to permit, upon the payment of a fee, any one said plurality of cradles to be opened, said controller being responsive to said sensors to determine when a first one of said cradles is partially opened, and said controller being operable to permit said first cradle to be fully opened while preventing the other ones of said plurality of cradles from being opened enough to withdraw an item so as to restrict items dispensed to one item per fee, said controller including at least one of manually reconfigurable dual inline package (DIP) switches and post jumpers by which said controller is operable to determine pricing of the product that is to be vended.

24. A vending machine for vending items, said vending machine comprising:

a dispenser to store and dispense said vended items, said dispenser including a plurality of motion-controllable cradles, each of said cradles being operable to convey one of said items to a customer, said plurality of cradles being formed and mounted in said dispenser so as to rotate to a closed position due to gravity;

a plurality of sensors to sense open or closed states of said cradles, respectively; and a controller to permit, upon the payment of a fee, any one said plurality of cradles to be opened, said controller being responsive to said sensors to determine when a first one of said cradles is partially opened, and said controller being operable to permit said first cradle to be fully opened while preventing the other ones of said plurality of cradles from being opened enough to withdraw an item so as to restrict items dispensed to one item per fee.

25. A vending machine for vending items, said vending machine comprising:

a dispenser to store and dispense said vended items, said dispenser including a plurality of motion-controllable cradles, each of said cradles being operable to convey one of said items to a customer;

a plurality of constant-force springs to bias said plurality of cradles to a closed position, respectively;

a plurality of sensors to sense open or closed states of said cradles, respectively; and a controller to permit, upon the payment of a fee, any one said plurality of cradles to be opened, said controller being responsive to said sensors to determine when a first one of said cradles is partially opened, and said controller being operable to permit said first cradle to be fully opened while preventing the other ones of said plurality of cradles from being opened enough to withdraw an item so as to restrict items dispensed to one item per fee.

* * * * *

UNITED STATES PATENT AND TRADEMARK OFFICE

CERTIFICATE OF CORRECTION

PATENT NO. : 6,234,345 B1
DATED : May 22, 2001
INVENTOR(S) : Minh et al.

It is certified that error appears in the above-identified patent and that said Letters Patent is hereby corrected as shown below:

Column 12, claim 9,
Line 46, "complimentarily-shaped" should read -- complementarily-shaped --.

Signed and Sealed this

Fifth Day of March, 2002

*Attest:*

JAMES E. ROGAN

*Attesting Officer* — *Director of the United States Patent and Trademark Office*